(12) United States Patent
Park

(10) Patent No.: US 12,428,052 B2
(45) Date of Patent: Sep. 30, 2025

(54) COOPERATIVE STEERING APPARATUS AND VEHICLE STEERING APPARATUS HAVING THE SAME

(71) Applicant: HYUNDAI MOBIS CO., LTD., Seoul (KR)

(72) Inventor: Su Ju Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 544 days.

(21) Appl. No.: 18/066,930

(22) Filed: Dec. 15, 2022

(65) Prior Publication Data
US 2023/0331294 A1 Oct. 19, 2023

(30) Foreign Application Priority Data

Apr. 15, 2022 (KR) .......... 10-2022-0047022
Apr. 15, 2022 (KR) .......... 10-2022-0047023

(51) Int. Cl.
*B62D 5/06* (2006.01)
*B62D 5/00* (2006.01)
*B62D 5/30* (2006.01)

(52) U.S. Cl.
CPC ............. *B62D 5/063* (2013.01); *B62D 5/001* (2013.01); *B62D 5/30* (2013.01)

(58) Field of Classification Search
CPC .......... B62D 1/183; B62D 5/001; B62D 5/30; B62D 5/063; F16H 49/001; F16H 55/0833; F16H 2049/003; F16H 2049/006

USPC ................... 74/640; 180/400, 421
See application file for complete search history.

(56) References Cited

U.S. PATENT DOCUMENTS

2006/0213320 A1* 9/2006 Menjak ................. B62D 5/008
74/640

FOREIGN PATENT DOCUMENTS

KR 10-1876625 7/2018

OTHER PUBLICATIONS

English Language Abstract of KR 10-1876625 published on Jul. 9, 2018.

* cited by examiner

*Primary Examiner* — Valentin Neacsu
*Assistant Examiner* — Felicia L. Brittman-Alabi
(74) *Attorney, Agent, or Firm* — DLA PIPER LLP US

(57) ABSTRACT

A cooperative steering apparatus including an input shaft rotating as a steering wheel of a vehicle rotates, a drive motor including a rotor that rotates independently of the input shaft, and a speed reducer including a wave generator rotating as the rotor rotates, a flex spline rotating as the input shaft rotates, a circular spline rotating as at least one of the wave generator and the flex spline rotates, and an output shaft rotating coaxially with the circular spline, wherein when the vehicle travels in an autonomous driving mode, the input shaft does not rotate, and only the rotor rotates so that the output shaft rotates.

15 Claims, 12 Drawing Sheets

COOPERATIVE STEERING APPARATUS AND VEHICLE STEERING APPARATUS HAVING THE SAME

CROSS-REFERENCE TO RELATED APPLICATION

This application claims priority from and the benefits of Korean Patent Application No. 10-2022-0047022, filed on Apr. 15, 2022, and Korean Patent Application No. 10-2022-0047023, filed on Apr. 15, 2022, which are hereby incorporated by reference for all purposes as if set forth herein.

BACKGROUND

Technical Field

Exemplary embodiments of the present disclosure relate to a cooperative steering apparatus and a vehicle steering apparatus having the same, and more particularly, to a cooperative steering apparatus applicable to autonomous driving and a vehicle steering apparatus having the same.

Discussion of the Background

A vehicle steering apparatus is an apparatus that reduces driver's operating force when the driver turns a steering wheel to change a traveling direction of a vehicle. The vehicle steering apparatus is divided into a hydraulic steering apparatus and an electronic steering apparatus. The hydraulic steering apparatus includes an oil pump that generates hydraulic pressure by using driving force of an engine.

In the conventional hydraulic steering apparatus, when a rev count of the engine is low, such as at low-speed driving, the hydraulic pressure of the oil pump is insufficient, which leads to a lack of steering assistance power, and when the rev count of the engine is high, such as at high-speed driving, the hydraulic pressure of the oil pump is excessive, which lightens handling of a steering wheel and hinders safe driving. However, in recent years, driving convenience is improved by providing a hydraulic control valve for adjusting the hydraulic pressure according to the driving speed of the vehicle.

An electronic power steering (EPS) apparatus generates steering assistance power only with driving force of an electric motor. Since a steering angle of a wheel can be precisely changed as a control signal is applied to the electric motor, an autonomous driving function may be more easily added to a vehicle equipped with the EPS apparatus than a vehicle equipped with the hydraulic steering apparatus. However, since a large vehicle such as a truck and a bus requires a greater steering assistance power than a small vehicle, the hydraulic steering apparatus is mainly applied to the large vehicle rather than the EPS apparatus. Accordingly, it is difficult to apply the autonomous driving function to the large vehicle.

When a traveling direction of the wheel is changed while a vehicle having the autonomous driving function is operating in an autonomous driving mode, a steering wheel rotates in synchronization with the changed traveling direction even though a driver does not rotate the steering wheel. Therefore, it is impossible to move the steering wheel to make the space for a driver's seat wider, and the driver cannot rest comfortably even in an autonomous driving state because the driver cannot lean his/her arm on the steering wheel.

The background technology of the present disclosure is disclosed in Korean Patent No. 10-1876625 (Jul. 9, 2018) entitled "STEERING SYSTEM USING A HYDRAULIC MOTOR".

SUMMARY

Various embodiments are directed to a cooperative steering apparatus having a configuration for steering a vehicle according to an autonomous driving steering control signal, and a vehicle steering apparatus having the cooperative steering apparatus.

Also, various embodiments are directed to a cooperative steering apparatus, which locks a steering wheel so that the steering wheel does not rotate even though a steering direction of the wheel is changed during autonomous driving of a vehicle, and a vehicle steering apparatus having the cooperative steering apparatus.

In an embodiment, a cooperative steering apparatus includes: an input shaft rotating as a steering wheel of a vehicle rotates; a drive motor including a rotor that rotates independently of the input shaft; and a speed reducer including a wave generator rotating as the rotor rotates, a flex spline rotating as the input shaft rotates, a circular spline rotating as at least one of the wave generator and the flex spline rotates, and an output shaft rotating coaxially with the circular spline, wherein when the vehicle travels in an autonomous driving mode, the input shaft does not rotate, and only the rotor rotates so that the output shaft rotates.

The rotor may be disposed coaxially with the input shaft, and the input shaft may pass through the rotor.

The circular spline may include a rigid ring unit connected to the output shaft, and an inner circumferential gear unit having a plurality of gear teeth formed on an inner circumferential surface of the rigid ring unit, and the flex spline may include a deformable ring unit configured to surround the wave generator and whose shape is deformed as the wave generator rotates, and an outer circumferential gear unit having a plurality of gear teeth formed on an outer circumferential surface of the deformable ring unit, and meshed with the inner circumferential gear unit.

The cooperative steering apparatus may further include: an input side steering angle sensor configured to measure a rotation angle of the input shaft; and an output side steering angle sensor configured to measure a rotation angle of the output shaft.

The cooperative steering apparatus may further include: a steering wheel connection shaft having a first end connected to the steering wheel and a second end connected to the input shaft, and configured to transmit rotation of the steering wheel to the input shaft; and a rotation locking part configured to block rotation of the steering wheel connection shaft.

The rotation locking part may include a stopper protrusion protruding toward the input shaft so as not to contact the input shaft, and a protrusion fastening unit opened from a tail end of the second end of the steering wheel connection shaft toward the first end thereof, and in a state in which the stopper protrusion and the protrusion fastening unit are aligned in a direction parallel to an axis of the input shaft, the steering wheel connection shaft may move toward the output shaft and the stopper protrusion may be inserted into the protrusion fastening unit so that the rotation of the steering wheel connection shaft is blocked.

In an embodiment, a vehicle steering apparatus includes: a cooperative steering apparatus including: an input shaft rotating as a steering wheel of a vehicle rotates; a drive motor including a rotor that rotates independently of the input shaft; and a speed reducer including a wave generator rotating as the rotor rotates, a flex spline rotating as the input shaft rotates, a circular spline rotating as at least one of the wave generator and the flex spline rotates, and an output shaft rotating coaxially with the circular spline; and a main steering apparatus configured to change steering angles of wheels of the vehicle in conjunction with rotation of the output shaft, wherein when the vehicle travels in an autonomous driving mode, the input shaft does not rotate, and only the rotor rotates so that the output shaft rotates.

The main steering apparatus may be a hydraulic steering apparatus including a steering gear box configured to change the steering angles of the wheels, and an oil pump configured to pressurize hydraulic oil and inject hydraulic oil into the steering gear box.

In an embodiment, a cooperative steering apparatus includes: an input shaft rotating as a steering wheel of a vehicle rotates; a drive motor including a rotor that rotates independently of the input shaft; a speed reducer including a wave generator rotating as the rotor rotates, a flex spline rotating as the input shaft rotates, a circular spline rotating as at least one of the wave generator and the flex spline rotates, and an output shaft rotating coaxially with the circular spline; a steering wheel connection shaft having a first end connected to the steering wheel and a second end connected to the input shaft, and configured to transmit rotation of the steering wheel to the input shaft; and a rotation locking part configured to selectively block rotation of the steering wheel connection shaft, and including a lock pin that is movable in a direction approaching the steering wheel connection shaft from the outside of the steering wheel connection shaft and in the opposite direction thereof.

The rotation locking part may further include a solenoid configured to generate electromagnetic force for moving the lock pin.

The rotation locking part may further include a pin fastening unit into which the lock pin is inserted when the lock pin moves toward the steering wheel connection shaft.

The pin fastening unit may extend in a longitudinal direction of the steering wheel connection shaft so that the steering wheel connection shaft moves in the longitudinal direction in a state where the lock pin is inserted into the pin fastening unit.

The input shaft may not rotate because rotation of the steering wheel connection shaft is blocked when the vehicle travels in an autonomous driving mode.

The rotor may be disposed coaxially with the input shaft, and the input shaft may not rotate and only the rotor may rotate so that the output shaft rotates.

The cooperative steering apparatus may further include: an input side steering angle sensor configured to measure a rotation angle of the input shaft; and an output side steering angle sensor configured to measure a rotation angle of the output shaft.

According to an embodiment of the present disclosure, an autonomous driving steering signal is inputted to a cooperative steering apparatus instead of a main steering apparatus so as to steer a vehicle in an autonomous driving mode of the vehicle. Accordingly, it is possible to easily and reliably add an autonomous driving function even to a vehicle, such as a bus or a truck, in which a hydraulic steering apparatus is adopted as the main steering apparatus.

According to an embodiment of the present disclosure, when a steering direction of a wheel is changed in an autonomous driving mode, the steering wheel is locked so that it does not rotate in synchronization with the changed steering direction. Accordingly, in the autonomous driving mode, it is easy to move and store the steering wheel, and a driver can lean his/her arm on the steering wheel. Consequently, the driver can rest more comfortably in the autonomous driving mode.

DETAILED DESCRIPTION OF THE ILLUSTRATED EMBODIMENTS

Hereinafter, a cooperative steering apparatus and a vehicle steering apparatus having the same will be described below with reference to the accompanying drawings through various exemplary embodiments. Terms to be used in this specification are used to properly describe preferred embodiments of the present disclosure, and may be changed depending on a user or operator's intention or practice in the field to which the present disclosure pertains. Accordingly, such terms should be defined based on the overall contents of this specification.

Figure 1:
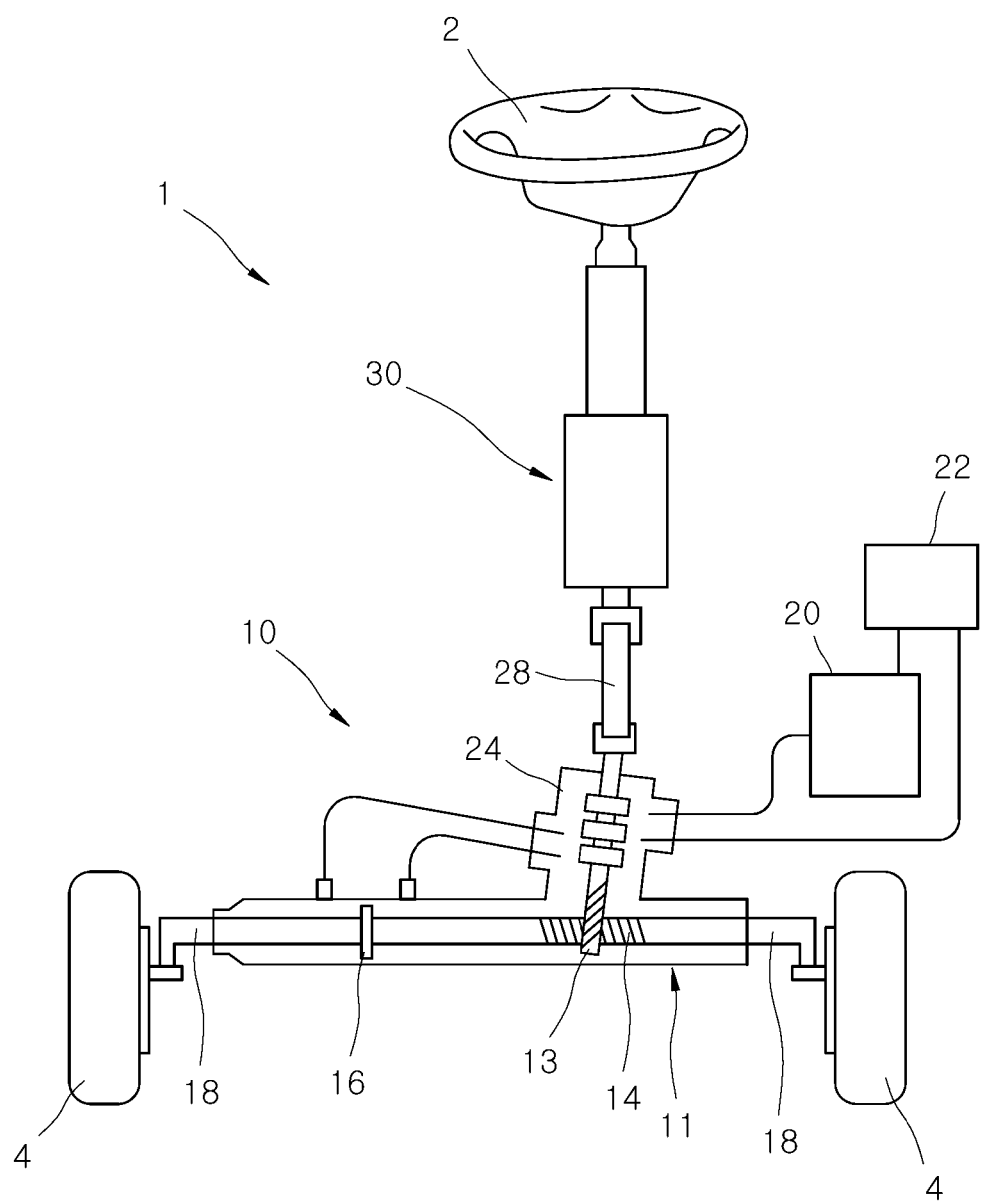
FIG. 1 is a diagram schematically illustrating a vehicle steering apparatus according to an embodiment of the present disclosure.
Figure 2:
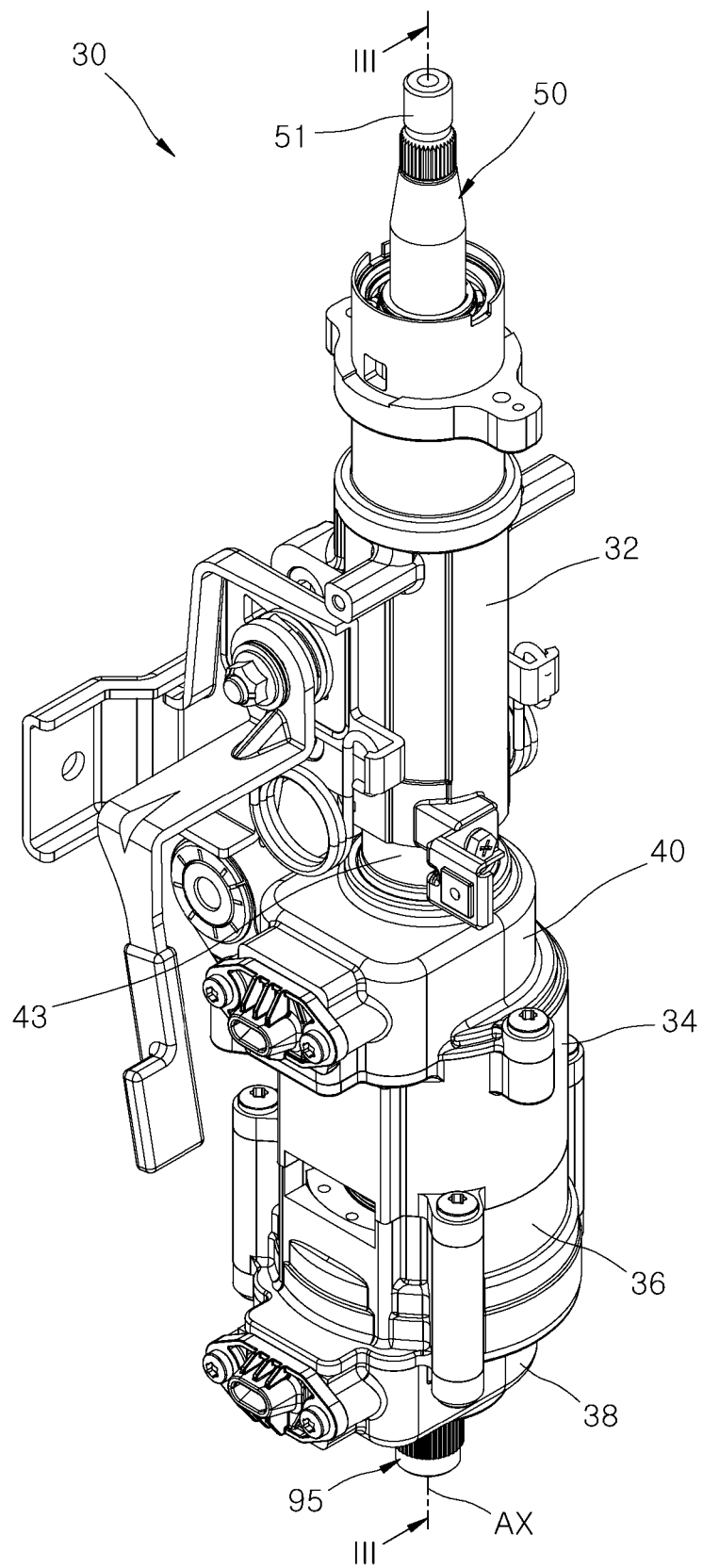
FIG. 2 is a perspective diagram illustrating a cooperative steering apparatus according to an embodiment of the present disclosure.
Figure 3:
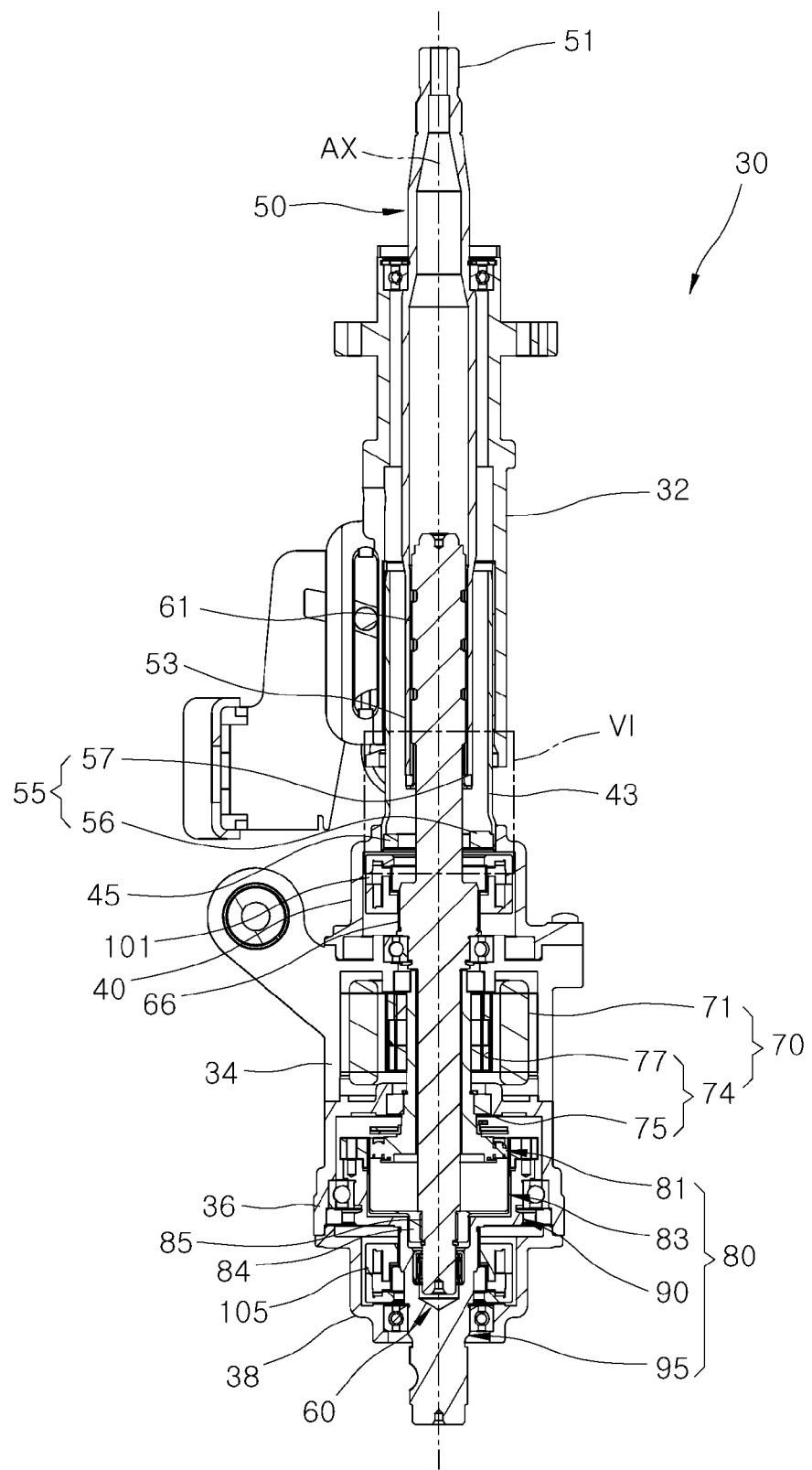
FIG. 3 is a cross-sectional diagram illustrating the cooperative steering apparatus taken along a III-III line of FIG. 2.
Figure 4:
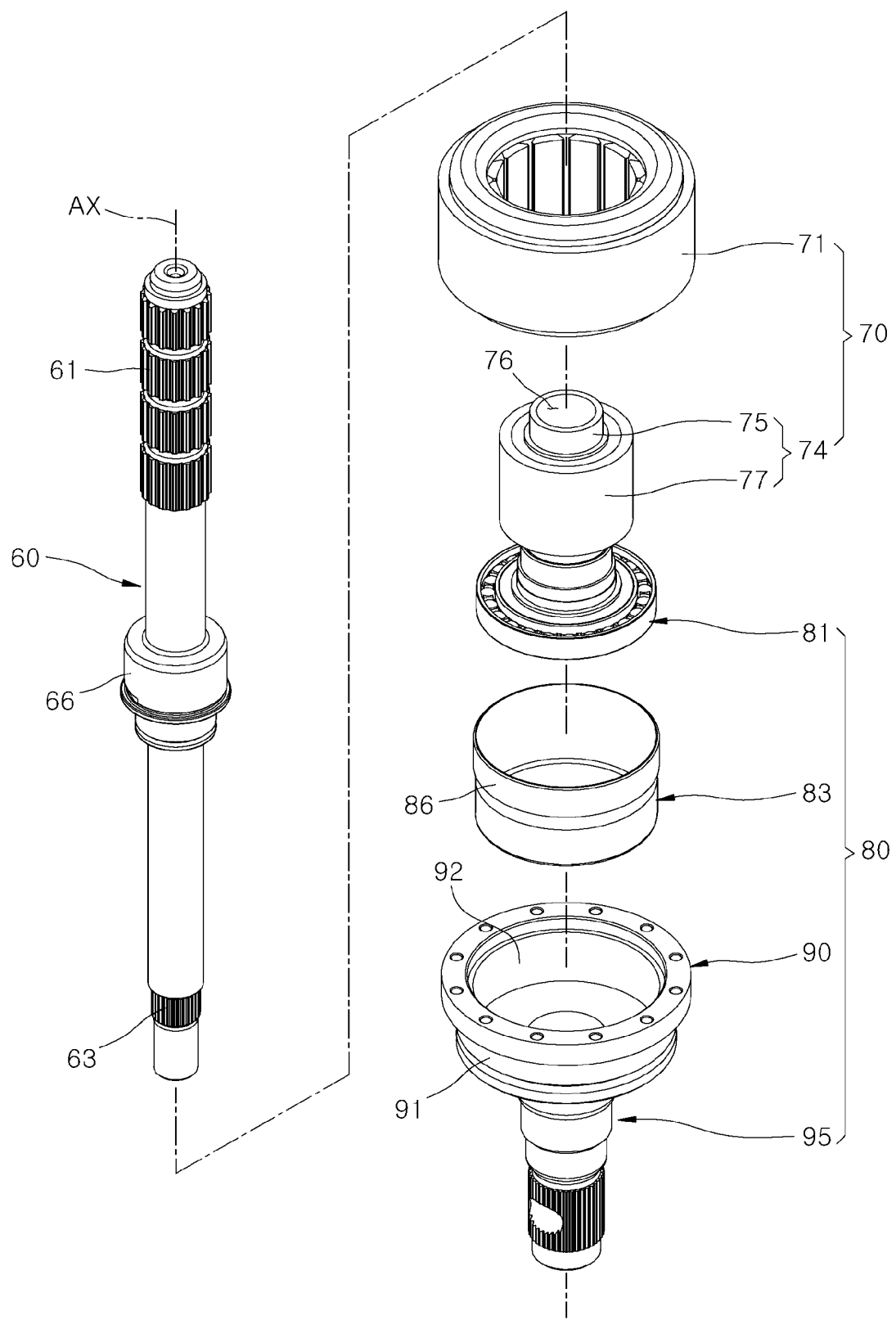
FIG. 4 is an exploded perspective diagram illustrating an input shaft and a speed reducer of FIG. 3.
Figure 5:
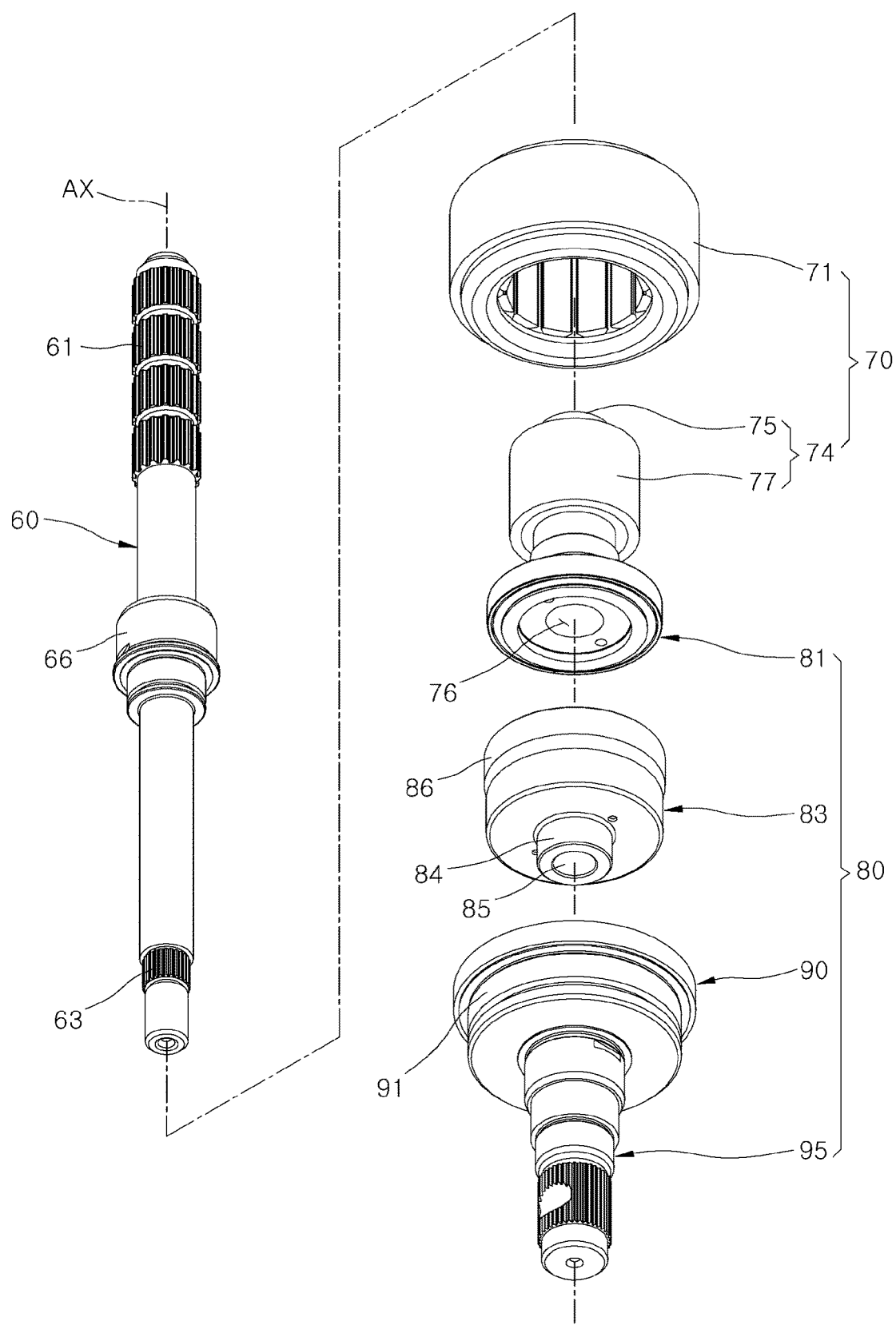
FIG. 5 is an exploded bottom perspective diagram illustrating the input shaft and the speed reducer of FIG. 3.
Figure 6:
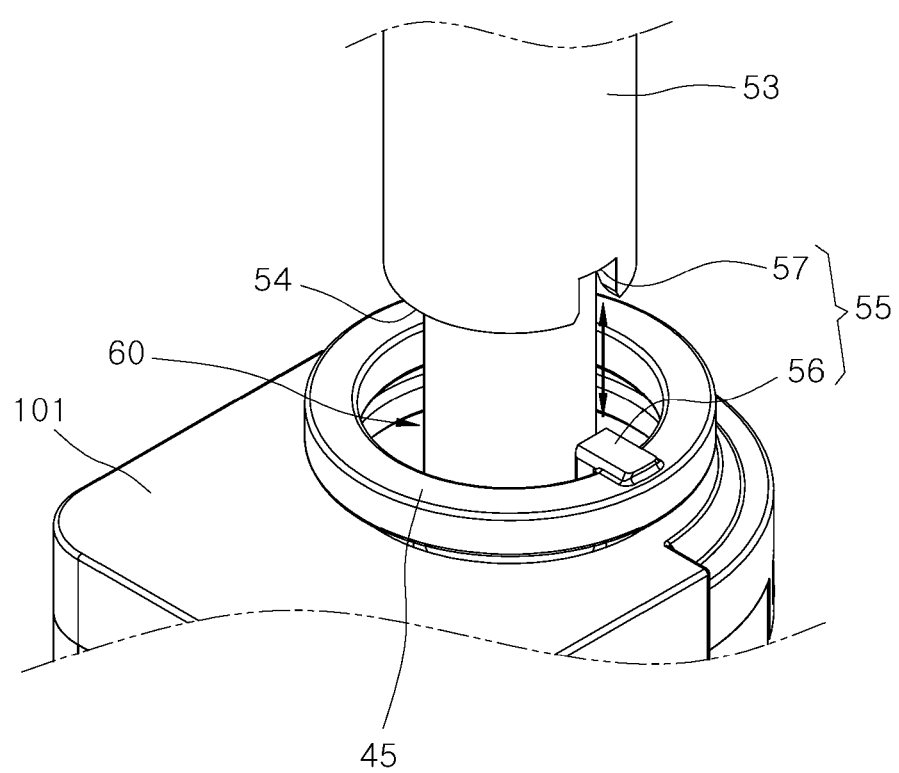
FIG. 6 is an enlarged perspective diagram illustrating a VI part of FIG. 3.

FIG. 1 is a diagram schematically illustrating a vehicle steering apparatus 1 according to an embodiment of the present disclosure, FIG. 2 is a perspective diagram illustrating a cooperative steering apparatus 30 according to an embodiment of the present disclosure, FIG. 3 is a cross-sectional diagram illustrating the cooperative steering apparatus 30 taken along a III-III line of FIG. 2, FIG. 4 is an exploded perspective diagram illustrating an input shaft 60 and a speed reducer 80 of FIG. 3, FIG. 5 is an exploded bottom perspective diagram illustrating the input shaft 60 and the speed reducer 80 of FIG. 3, and FIG. 6 is an enlarged perspective diagram illustrating a VI part of FIG. 3.

Referring to FIG. 1, the vehicle steering apparatus 1 according to an embodiment of the present disclosure reduces driver's operating force when the driver turns a steering wheel 2 to change a traveling direction of a vehicle.

The vehicle steering apparatus 1 includes a main steering apparatus 10, a cooperative steering apparatus 30, and a joint 28 configured to connect the cooperative steering apparatus 30 and the main steering apparatus 10 to transfer rotational force.

The main steering apparatus 10 changes steering angles of wheels 4 of the vehicle in conjunction with rotation of an output shaft 95 of the cooperative steering apparatus 30. The main steering apparatus 10 includes a steering gear box 11 configured to change the steering angles of the wheels 4 and a tie rod 18 connected to the wheels 4.

The steering gear box 11 includes a pinion gear 13 connected to a lower end of the joint 28, a rack 14 meshed with the pinion gear 13, and a hydraulic piston 16. The hydraulic piston 16 increases force at which the tie rod 18 changes the steering angles of the wheels 4.

The main steering apparatus 10 may further include an oil pump 20, an oil tank 22, and a hydraulic control valve 24.

The oil pump 20 pressurizes hydraulic oil and supplies high-pressure hydraulic oil to the hydraulic piston 16 of the steering gear box 11. The hydraulic oil supplied to the oil pump 20 is stored in the oil tank 22. The hydraulic control valve 24 adjusts the hydraulic pressure of the hydraulic oil supplied to the steering gear box 11 according to a traveling speed of the vehicle.

When the vehicle travels at a low speed, the hydraulic pressure control valve 24 controls the hydraulic pressure of the hydraulic oil so that a relatively high-pressure hydraulic oil is supplied to the steering gear box 11. When the vehicle travels at a high speed, the hydraulic pressure control valve 24 controls the hydraulic pressure of the hydraulic oil so that a relatively low-pressure hydraulic oil is supplied to the steering gear box 11. When the traveling speed of the vehicle is changed from low to high, surplus hydraulic oil is recovered from the hydraulic control valve 24 to the oil tank 22.

The main steering apparatus 10 may be a hydraulic steering apparatus having the oil pump 20. However, the main steering apparatus 10 illustrated in FIG. 1 is merely an example, and the vehicle steering apparatus 1 of the present disclosure may include another type of main steering apparatus such as an electronic power steering (EPS) apparatus, not the hydraulic steering apparatus.

Referring to FIGS. 2 to 6, the cooperative steering apparatus 30 according to an embodiment of the present disclosure includes housings 32, 34, 36, 38 and 40, an input shaft 60, a driving motor 70, and a speed reducer 80. The speed reducer 80 may be a strain wave speed reducer.

The cooperative steering apparatus 30 according to an embodiment of the present disclosure may further include a steering wheel connection shaft 50, an input side steering angle sensor 101, and an output side steering angle sensor 105.

The housings 32, 34, 36, 38 and 40 include an upper housing 32, an input side steering angle sensor housing 40, a driving motor housing 34, a speed reducer housing 36, and an output side steering angle sensor housing 38, which are sequentially disposed from top to bottom on the basis of FIG. 2.

The steering wheel connection shaft 50 is disposed in the upper housing 32, and the input side steering angle sensor 101 is disposed in the input side steering angle sensor housing 40. The drive motor 70 is disposed in the drive motor housing 34, the speed reducer 80 is disposed in the speed reducer housing 36, and the output side steering angle sensor 105 is disposed in the output side steering angle sensor housing 38.

The steering wheel connection shaft 50 may be a tubular member formed in a hollow shape and elongating along an axis AX. The steering wheel connection shaft 50 has a first end unit 51, specifically an upper end unit connected to the steering wheel 2, and a second end unit 53, specifically a lower end unit connected to the input shaft 60.

A plurality of male gear teeth spline-coupled to the steering wheel 2 may be formed on an outer circumferential surface of the first end unit 51, and a plurality of female gear teeth spline-coupled to the input shaft 60 may be formed on an inner circumferential surface of the second end unit 53.

The input shaft 60 elongates along the axis AX. The input shaft 60 includes a first end unit 61, which is an upper end unit inserted into the second end unit 53 of the steering wheel connection shaft 50, a second end unit 63, which is a lower end unit fastened to a flex spline 83 of the speed reducer 80, and a middle large diameter end unit 66 disposed between the first end unit 61 and the second end unit 63 and having a stepped enlarged diameter.

A plurality of male gear teeth spline-coupled to the second end 53 of the steering wheel connection shaft 50 may be formed on an outer circumferential surface of the first end unit 61 of the input shaft 60, and a plurality of male gear teeth spline-coupled to a lower ring unit 84 of the flex spline 83 may be formed on an outer circumferential surface of the second end unit 63 of the input shaft 60.

Since the steering wheel 2, the steering wheel connection shaft 50 and the input shaft 60 are spline-coupled, rotational force is transmitted to the input shaft 60 through the steering wheel connection shaft 50 when the steering wheel 2 rotates. Accordingly, when the steering wheel 2 rotates, the input shaft 60 rotates about the axis AX.

Since the steering wheel connection shaft 50 and the input shaft 60 are spline-coupled, the steering wheel connection shaft 50 may be moved up and down with respect to the input shaft 60 along the axis AX.

The upper housing 32 and the input side steering angle sensor housing 40 are connected by an upper housing support barrel 43. An upper end unit of the upper housing support barrel 43 may be inserted through a lower opening of the upper housing 32 to be fixedly coupled to an inner circumferential surface of the upper housing 32, and a lower end unit of the upper housing support barrel 43 may be inserted into and fixedly coupled to an inner circumferential edge defining an upper opening of the input side steering angle sensor housing 40.

The drive motor 70 includes a rotor 74 and a stator 71 disposed between the middle large diameter end unit 66 and the second end unit 63 of the input shaft 60.

The rotor 74 is disposed coaxially with the input shaft 60 rotatably about the axis AX. The input shaft 60 passes through the rotor 74. The rotor 74 includes a hollow tube 75 having a hollow portion 76 through which the input shaft 60 passes, and a magnet 77 installed to surround the hollow tube 75.

The stator 71 may include a coil configured to surround the magnet 77 and spaced apart from the magnet 77, and an iron core fixed to the driving motor housing 34 and configured to support the coil.

The driving motor 70 may include a motor electronic control unit (ECU) (not illustrated) that controls an electric signal applied to the coil. When a main ECU (not illustrated) of the vehicle may transmit a driving motor control signal to the motor ECU of the driving motor 70, and thus when the electric signal generated by the motor ECU is applied to the coil, the rotor 74 may rotate independently of the input shaft 60.

The speed reducer 80 includes a wave generator 81, the flex spline 83, a circular spline 90, and the output shaft 95. The speed reducer 80 may be a harmonic drive speed reducer.

The wave generator 81 is fixed to the hollow tube 75 of the rotor 74 and rotates as the rotor 74 rotates. Although the cross-sectional surface shape of the wave generator 81 is illustrated as circular in FIGS. 4 and 5, the cross-sectional surface shape of the wave generator 81 may be various closed curve shapes such as an elliptical shape other than a circular shape and a triangle having curved vertices.

The flex spline 83 may include a deformable ring unit 86, an outer circumferential gear unit (not illustrated), and the lower ring unit 84.

The deformable ring unit 86 has an opened upper side into which the wave generator 81 is inserted, and the deformable ring unit 86 surrounds the wave generator 81. An inner circumferential surface of the deformable ring unit 86 is in contact with an outer circumferential surface of the wave generator 81, and as the wave generator 81 rotates, the shape of the deformable ring unit 86 is deformed. The outer circumferential gear unit may include a plurality of gear teeth (not illustrated) formed on an outer circumferential surface of the deformable ring unit 86.

The lower ring unit 84 may include a plurality of female gear teeth formed on an inner circumferential surface 85 thereof. The plurality of male gear teeth formed on the outer circumferential surface of the lower end unit 63 of the input shaft 60 are meshed with the plurality of female gear teeth formed on the inner circumferential surface 85 of the lower ring unit 84, so that the lower end unit 63 of the input shaft 60 and the lower ring unit 84 of the flex spline 83 may be spline-coupled. Thus, when the input shaft 60 rotates, the flex spline 83 also rotates. The flex spline 83 may be formed of a deformable metal material.

The circular spline 90 includes a rigid ring unit 91 and an inner circumferential gear unit (not illustrated). The rigid ring unit 91 has a cross section in the shape of a circular ring, and the rigid ring unit 91 has an opened upper side into which the deformable ring unit 83 is inserted, and a lower end unit connected to the output shaft 95. The inner circumferential gear unit may include a plurality of gear teeth (not illustrated) formed on an inner circumferential surface of the rigid ring unit 91.

The inner circumferential gear unit of the circular spline 90 is meshed with the flex spline 83, specifically, the outer circumferential gear unit of the deformable ring unit 86. In other words, only some of the plurality of male gear teeth belonging to the outer circumferential gear unit of the flex spline 83 may be meshed with the inner circumferential gear unit of the circular spline 90. When the wave generator 81 rotates about the axis AX as the rotor 74 rotates, a meshed point between the outer circumferential gear unit of the flex spline 83 and the inner circumferential gear unit of the circular spline 90 may change, and the circular spline 90 may also rotate about the axis AX.

When the input shaft 60 rotates, the flex spline 83 rotates about the axis AX, and thus the meshed point between the outer circumferential gear unit of the flex spline 83 and the inner circumferential gear unit of the circular spline 90 changes, and the circular spline 90 rotates about the axis AX. Consequently, the circular spline 90 rotates as at least one of the wave generator 81 and the flex spline 83 rotates.

An example will be described, in which the vehicle travels in a manual driving mode. When a direction in which the driver steers the steering wheel 2 and a rotation direction of the drive motor 70 are opposite to each other, in other words, when a rotation direction of the input shaft 60 and a rotation direction of the rotor 74 are opposite to each other, the steering ratio, which is the ratio of a rotation angle of the output shaft 95 to a rotation angle of the input shaft 60, decreases. In this case, the steering angles of the wheels 4 decrease compared to the case where the rotor 74 does not rotate and only the input shaft 60 rotates. That is, the steering angles outputted to the wheels 4 are smaller than the steering angles inputted by the driver. When the vehicle travels at a high speed, the main controller of the vehicle may control the driving motor 70 so that the steering ratio decreases as described above.

When the direction in which the driver steers the steering wheel 2 and the rotation direction of the drive motor 70 are the same as each other, in other words, when the rotation direction of the input shaft 60 and the rotation direction of the rotor 74 are the same as each other, the steering ratio, which is the ratio of the rotation angle of the output shaft 95 to the rotation angle of the input shaft 60, increases. In this case, the steering angles of the wheels 4 increase compared to the case where the rotor 74 does not rotate, and only the input shaft 60 rotates. That is, the steering angles outputted to the wheels 4 are greater than the steering angles inputted by the driver. When the vehicle travels at a low speed, the main controller of the vehicle may control the driving motor 70 so that the steering ratio increases as described above.

The output shaft 95 extends along the axis AX, and is connected to a lower end of the rigid ring unit 91. The circular spline 90 and the output shaft 95 may be integrally formed as a single member. Accordingly, the output shaft 95 rotates coaxially when the circular spline 90 rotates. A plurality of male gear teeth spline-coupled to an upper end unit of the joint 28 may be formed on an outer circumferential surface of a lower end unit of the output shaft 95.

The input side steering angle sensor 101 may be installed to surround the middle large diameter end unit 66 of the input shaft 60, and measure the rotation direction and rotation angle of the input shaft 60 that rotates as the driver rotates the steering wheel 2. The output side steering angle sensor 105 may be installed to surround an upper side of the male gear teeth of the output shaft 95, and measure the rotation direction and rotation angle of the output shaft 95.

When the vehicle travels, a detection signal of the input side steering angle sensor 101 is transmitted to the main controller of the vehicle, and the main controller of the vehicle determines the rotation direction and rotation angle of the rotor 74 on the basis of the detection signal inputted from the input side steering angle sensor 101 and the vehicle speed, and the driving motor control signal corresponding thereto is transmitted to the motor ECU (not illustrated) of the driving motor 70.

A detection signal of the output side steering angle sensor 105 is transmitted to the main controller of the vehicle. The main controller of the vehicle may compare the rotation direction and rotation speed of the output shaft 95, calculated on the basis of the detection signal inputted from the input side steering angle sensor 101 and the driving motor control signal transmitted to the motor ECU, with the actual rotation direction and rotation speed of the output shaft 95 identified through the detection signal of the output side steering angle sensor 105.

When the vehicle travels in an autonomous driving mode, the steering wheel 2, the steering wheel connection shaft 50 and the input shaft 60 do not rotate, but only the rotor 74 rotates so that the output shaft 95 rotates. That is, in the case of the autonomous driving mode, the steering wheel 2 is fixed in a non-rotating state, and the operation of the driving motor 70 is controlled according to an autonomous driving signal to rotate the output shaft 95.

The cooperative steering apparatus 30 according to an embodiment of the present disclosure may further include a rotation locking part 55 that selectively blocks rotation of the steering wheel connection shaft 50.

The rotation locking part 55 includes a stopper protrusion 56 and a protrusion fastening unit 57. The stopper protrusion 56 protrudes toward the axis AX of the input shaft 60 so as not to contact the input shaft 60 from the outside of the input shaft 60.

In other words, the stopper protrusion 56 protrudes inwardly toward the axis AX from an annular housing inner circumferential rim 45. The housing inner circumferential rim 45 may be disposed at an inner circumferential edge defining a top opening of the input side steering angle sensor housing 40. The housing inner circumferential rim 45 may be fixedly coupled to an inner circumferential surface of the lower end unit of the upper housing support barrel 43.

The protrusion fastening unit 57 is formed to be opened from a tail end 54 of the second end unit 53 of the steering wheel connection shaft 50 toward the first end unit 51 thereof. The protrusion fastening unit 57 may be a dent or a stepped groove as illustrated in FIG. 6. As illustrated in FIG. 6, in a state in which the stopper protrusion 56 and the protrusion fastening unit 57 are aligned in a direction parallel to the axis AX, when the steering wheel connection shaft 50 moves toward the output shaft 95, that is, moves downward, the stopper protrusion 56 is inserted into the protrusion fastening unit 57, and the rotation of the steering wheel connection shaft 50 is blocked. Accordingly, the steering wheel 2, the steering wheel connection shaft 50 and the input shaft 60 are locked so as not to rotate.

When the driver puts the steering wheel 2 at a neutral angle that is not biased in any one direction, and presses the steering wheel 2 down in the direction of the axis AX, the protrusion fastening unit 57 may be inserted into the stopper protrusion 56. Conversely, when the driver pulls the steering wheel 2 up, the stopper protrusion 56 is separated from the protrusion fastening unit 57, and the steering wheel 2, the steering wheel connection shaft 50 and the input shaft 60 are unlocked.

The driver may lock the steering wheel 2, the steering wheel connection shaft 50 and the input shaft 60 from rotation through the rotation locking part 55 when the vehicle travels in the autonomous driving mode. Meanwhile, the main controller of the vehicle may set the autonomous driving mode to be turned on (ON) only when the steering wheel 2, the steering wheel connection shaft 50 and the input shaft 60 are locked so as not to rotate by the rotation locking part 55, and set the autonomous driving mode to be turned off (OFF) when the steering wheel 2, the steering wheel connection shaft 50 and the input shaft 60 rotate.

When the vehicle needs a change in the traveling direction while traveling in the autonomous driving mode, the driving motor control signal is transmitted from the main controller of the vehicle to the motor ECU, and the input shaft 60 does not rotate but only the rotor 74 rotates in response to the driving motor control signal, so that the output shaft 95 rotates.

According to the vehicle steering apparatus 1 in accordance with an embodiment of the present disclosure, it is possible to steer the vehicle, for example, the wheels 4, by inputting autonomous driving steering signal to the cooperative steering apparatus 30, instead of inputting the autonomous driving steering signal to the main steering apparatus 10, in the autonomous driving mode of the vehicle. Accordingly, it is possible to easily and reliably add an autonomous driving function to the vehicle, such as a bus or a truck, in which the hydraulic steering apparatus is adopted as the main steering apparatus 10.

The cooperative steering apparatus 30 causes the steering wheel 2 not to rotate in the autonomous driving mode so that when the steering direction of the wheels 4 is changed, the steering wheel 2 does not rotate in synchronization with the wheels 4. Therefore, it is easy to accommodate the steering wheel 2 in the autonomous driving mode, and it is possible to secure a driver's space. In addition, since the steering wheel 2 does not rotate, even though the driver leans against the steering wheel 2, the autonomous driving is not disturbed, so that the driver may rest more comfortably.

Figure 7:
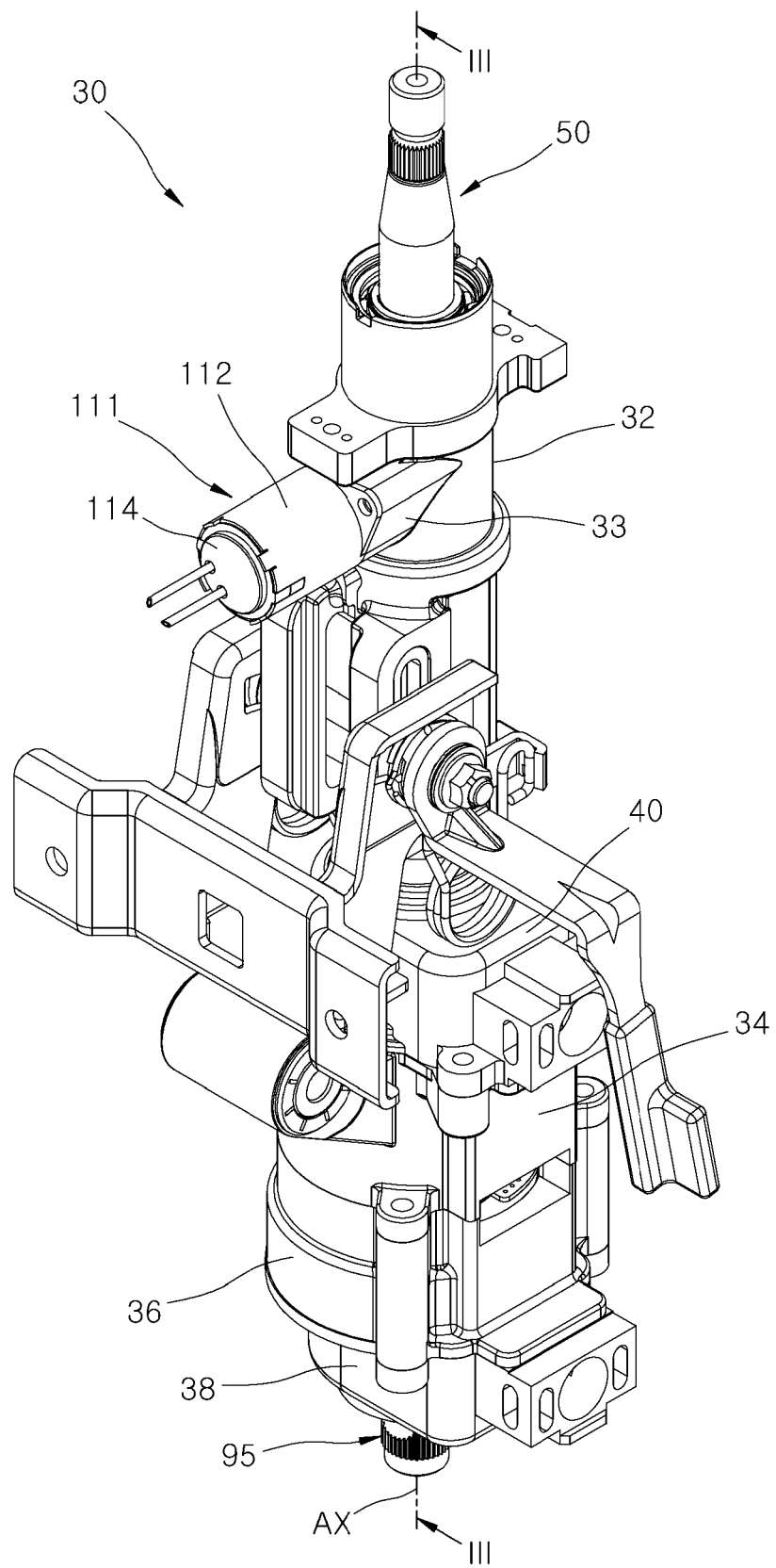
FIG. 7 is a perspective diagram illustrating a cooperative steering apparatus according to another embodiment of the present disclosure.
Figure 8:
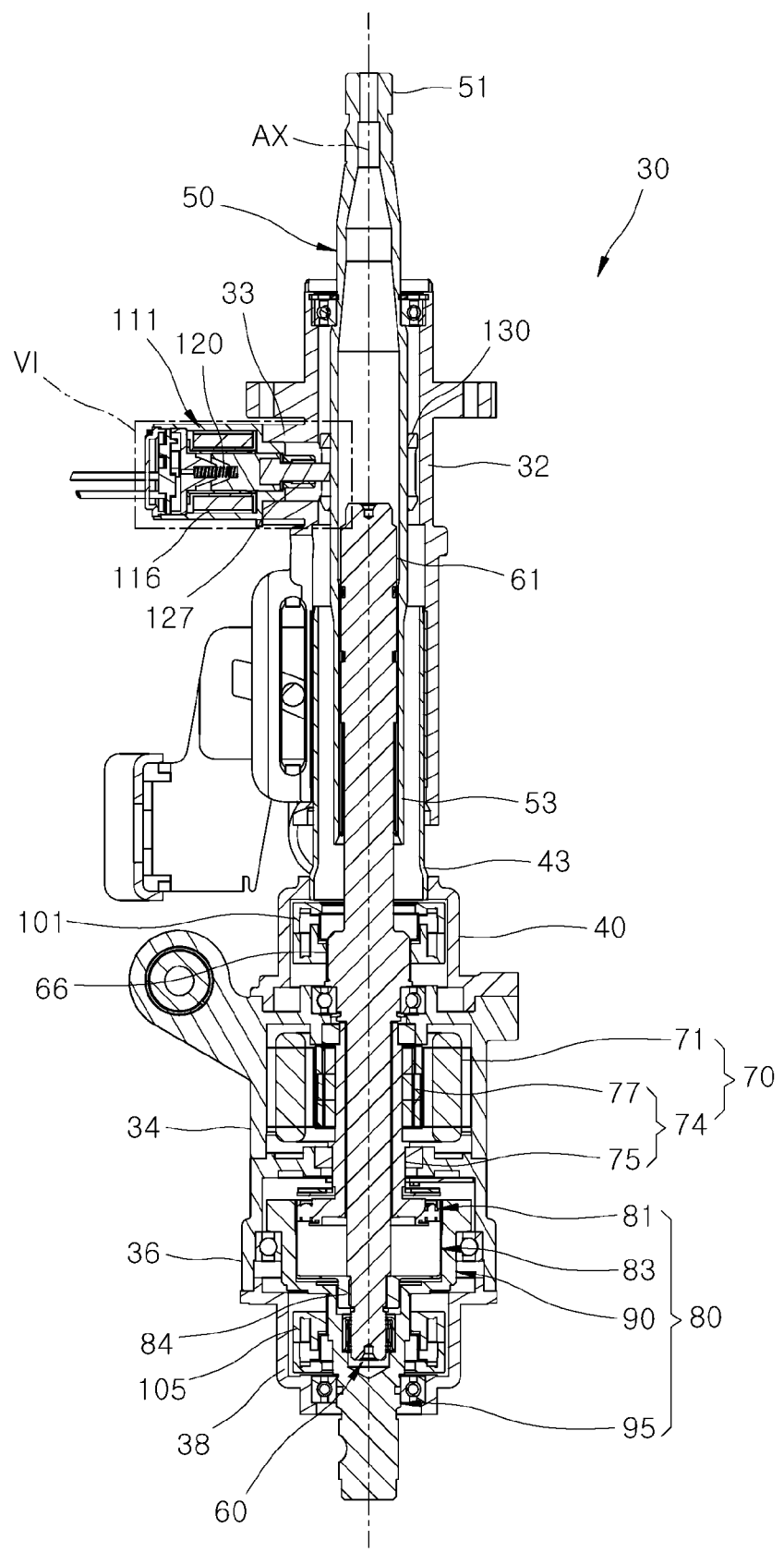
FIG. 8 is a cross-sectional diagram illustrating the cooperative steering apparatus taken along a III-III line of FIG. 7.
Figure 9:
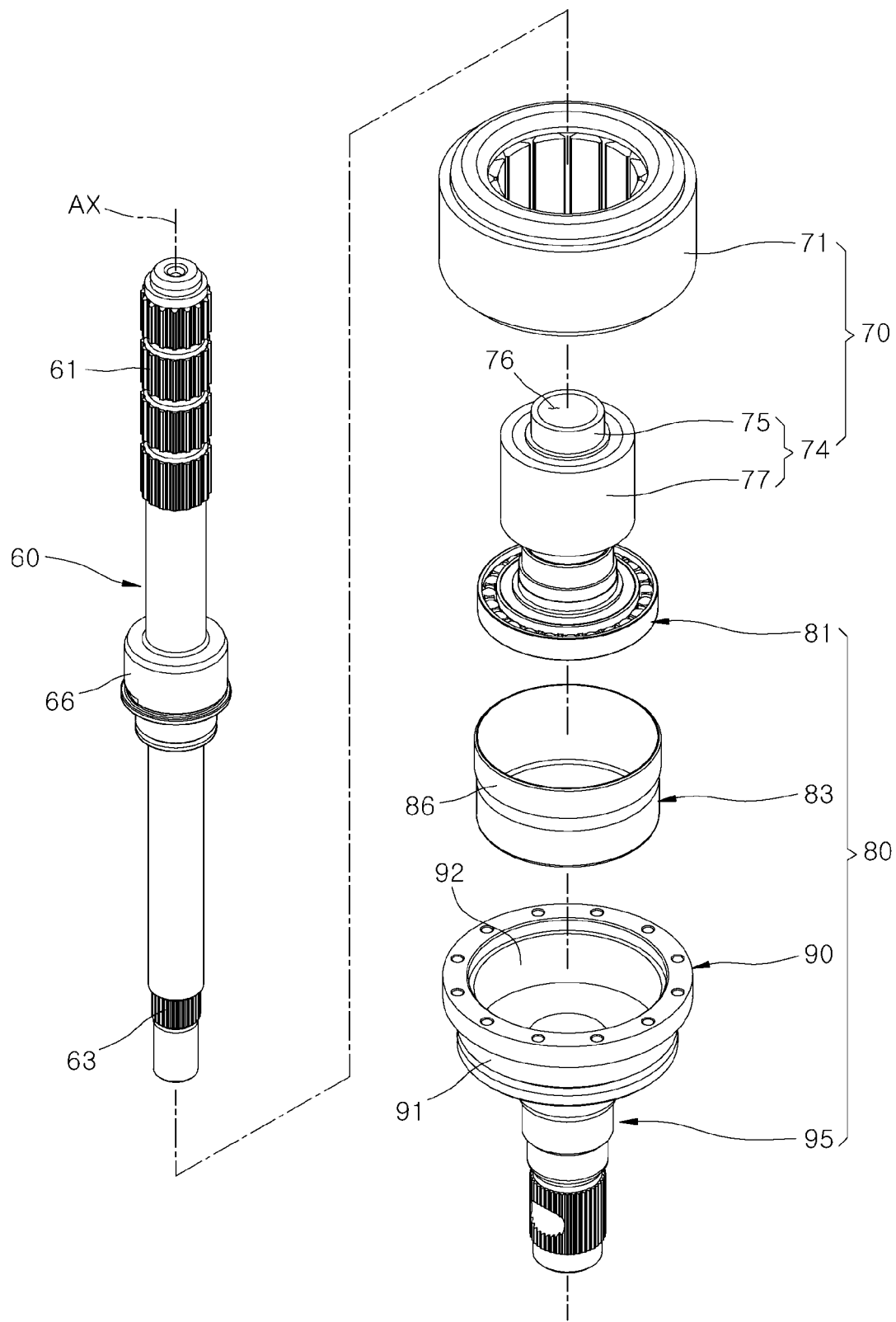
FIG. 9 is an exploded perspective diagram illustrating an input shaft and a speed reducer of FIG. 8.
Figure 10:
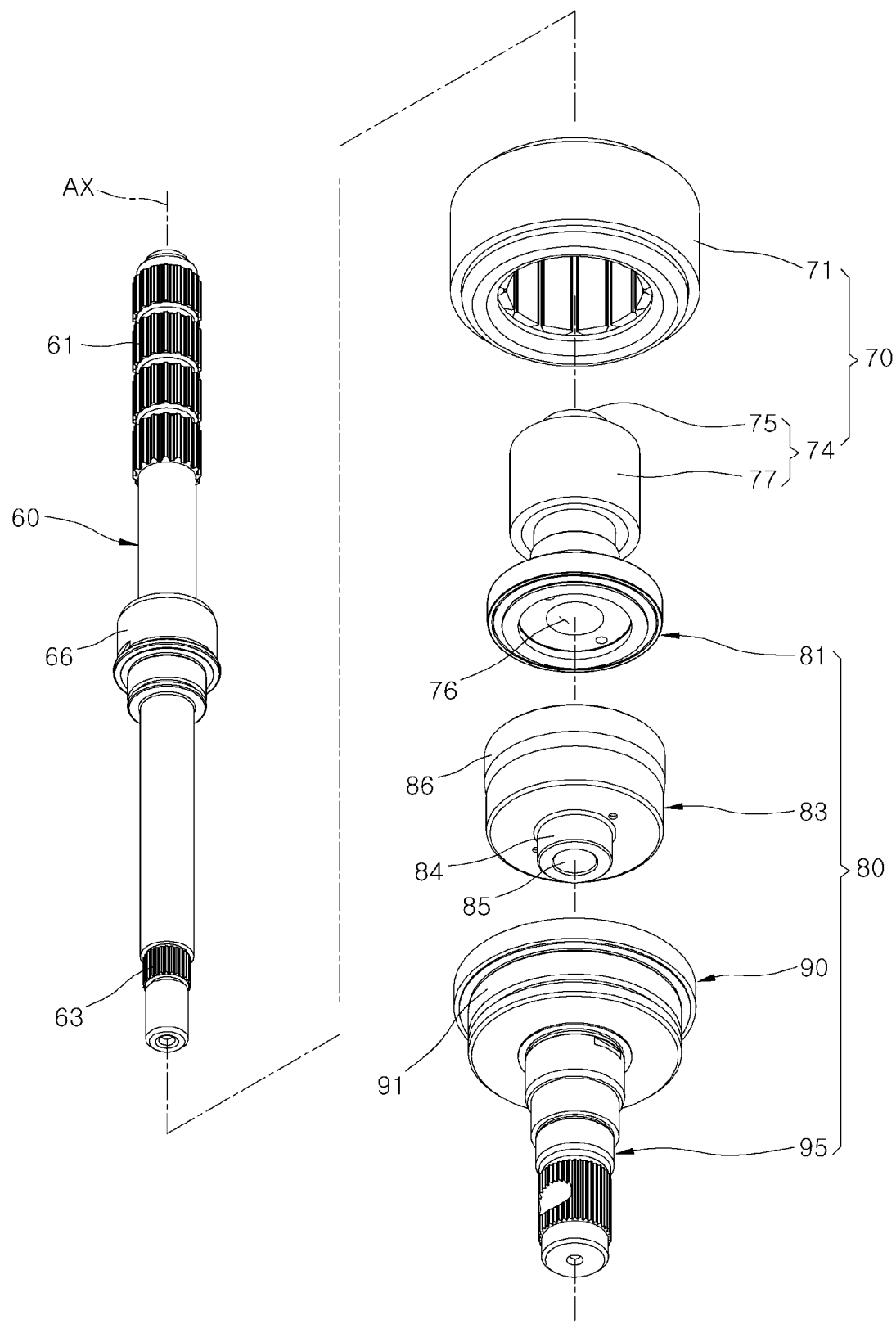
FIG. 10 is an exploded bottom perspective diagram illustrating the input shaft and the speed reducer of FIG. 8.
Figure 11:
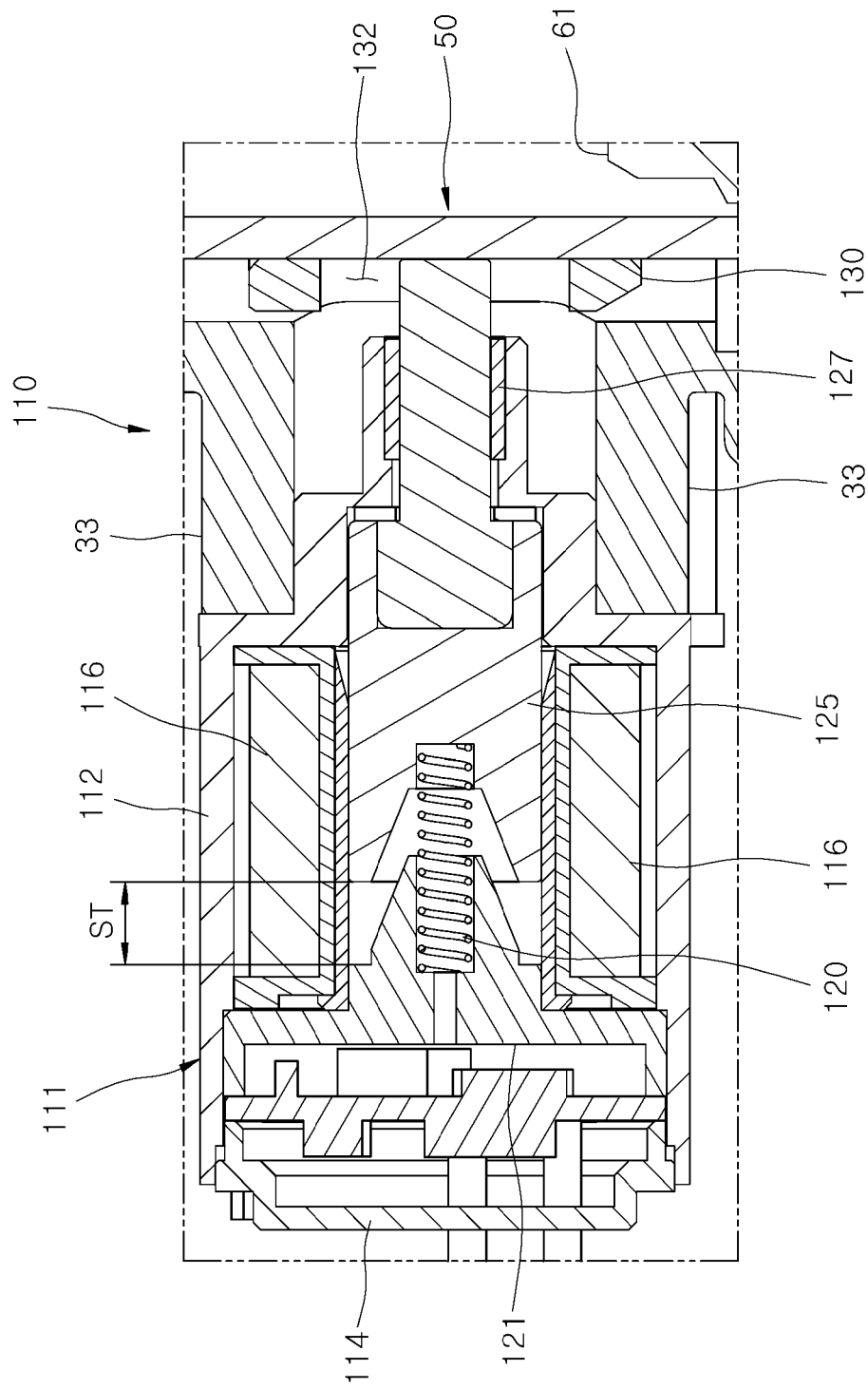
FIG. 11 is an enlarged cross-sectional diagram illustrating a VI part of FIG. 8.
Figure 12:
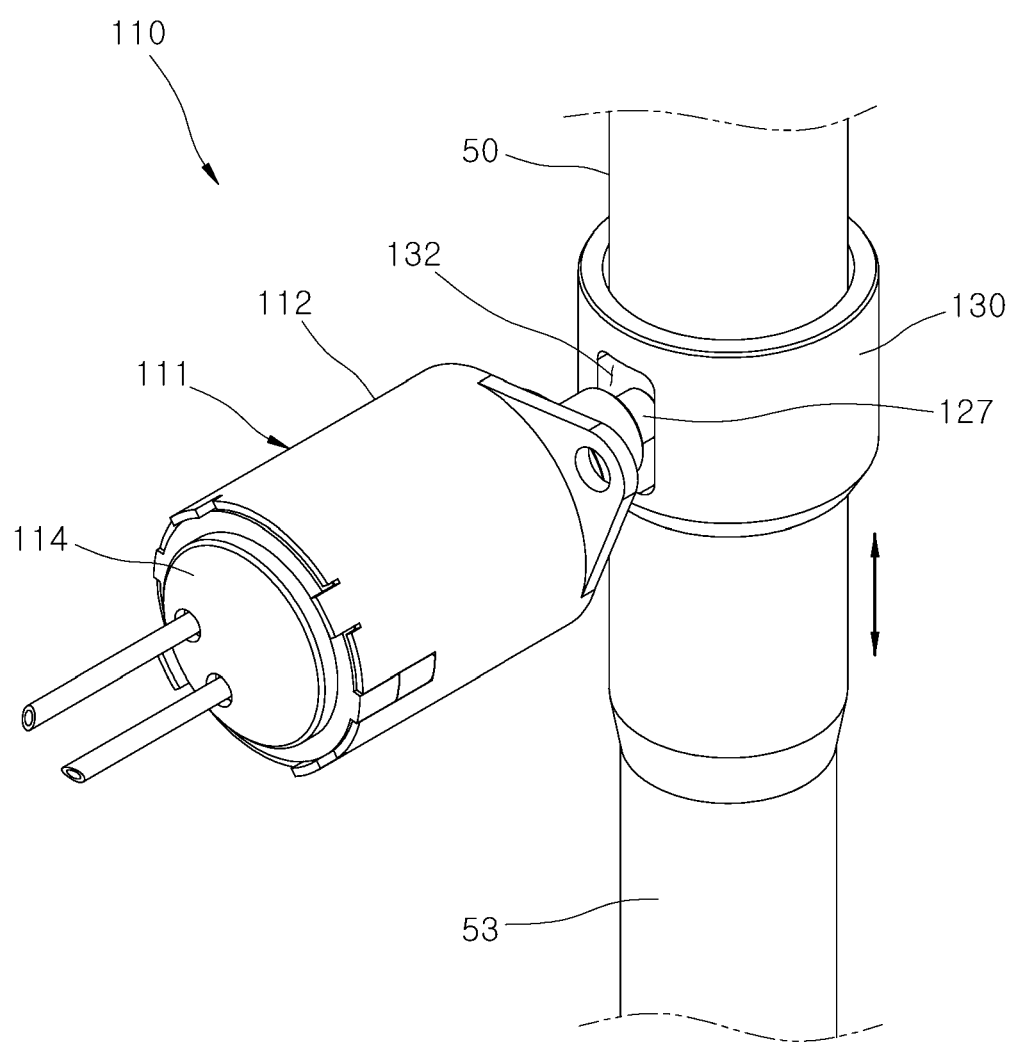
FIG. 12 is a perspective diagram illustrating a solenoid lock and a pin fastening unit of FIG. 11.

FIG. 7 is a perspective diagram illustrating a cooperative steering apparatus 30, FIG. 8 is a cross-sectional diagram illustrating the cooperative steering apparatus 30 taken along a III-III line of FIG. 7, FIGS. 9 and 10 are exploded perspective diagrams illustrating an input shaft 60 and a speed reducer 80 of FIG. 8, FIG. 11 is an enlarged cross-sectional diagram illustrating a VI part of FIG. 8, and FIG. 12 is a perspective diagram illustrating a solenoid lock 111 and a pin fastening unit 132 of FIG. 11. Herein, FIG. 9 is a view illustrating the input shaft 60 and the speed reducer 80 seen from above, and FIG. 10 is a view illustrating the input shaft 60 and the speed reducer 80 seen from below.

Referring to FIGS. 7 to 12, the cooperative steering apparatus 30 according to another embodiment of the present disclosure includes housings 32, 34, 36, 38 and 40, the input shaft 60, a driving motor 70, and the speed reducer 80. The speed reducer 80 may be a strain wave speed reducer.

The cooperative steering apparatus 30 according to another embodiment of the present disclosure may further include a steering wheel connection shaft 50, an input side steering angle sensor 101, and an output side steering angle sensor 105.

The housings 32, 34, 36, 38 and 40 include an upper housing 32, an input side steering angle sensor housing 40, a driving motor housing 34, a speed reducer housing 36, and an output side steering angle sensor housing 38, which are sequentially disposed from top to bottom on the basis of FIG. 7.

The steering wheel connection shaft 50 is disposed in the upper housing 32, and the input side steering angle sensor 101 is disposed in the input side steering angle sensor housing 40. The drive motor 70 is disposed in the drive motor housing 34, the speed reducer 80 is disposed in the speed reducer housing 36, and the output side steering angle sensor 105 is disposed in the output side steering angle sensor housing 38.

The steering wheel connection shaft 50 may be a tubular member formed in a hollow shape and elongating along an axis AX. The steering wheel connection shaft 50 has a first end unit 51, specifically an upper end unit connected to the steering wheel 2, and a second end unit 53, specifically a lower end unit connected to the input shaft 60.

A plurality of male gear teeth spline-coupled to the steering wheel 2 may be formed on an outer circumferential surface of the first end unit 51, and a plurality of female gear teeth spline-coupled to the input shaft 60 may be formed on an inner circumferential surface of the second end unit 53.

The input shaft 60 elongates along the axis AX. The input shaft 60 includes a first end unit 61, which is an upper end unit inserted into the second end unit 53 of the steering wheel connection shaft 50, a second end unit 63, which is a lower end unit fastened to a flex spline 83 of the speed reducer 80, and a middle large diameter end unit 66 disposed between the first end unit 61 and the second end unit 63 and having a stepped enlarged diameter.

A plurality of male gear teeth spline-coupled to the second end 53 of the steering wheel connection shaft 50 may be formed on an outer circumferential surface of the first end unit 61 of the input shaft 60, and a plurality of male gear teeth spline-coupled to a lower ring unit 84 of the flex spline 83 may be formed on an outer circumferential surface of the second end unit 63 of the input shaft 60.

Since the steering wheel 2, the steering wheel connection shaft 50 and the input shaft 60 are spline-coupled, rotational force is transmitted to the input shaft 60 through the steering wheel connection shaft 50 when the steering wheel 2 rotates. Accordingly, when the steering wheel 2 rotates, the input shaft 60 rotates about the axis AX.

Since the steering wheel connection shaft 50 and the input shaft 60 are spline-coupled, the steering wheel connection shaft 50 may be moved up and down with respect to the input shaft 60 along the axis AX.

The upper housing 32 and the input side steering angle sensor housing 40 are connected by an upper housing support barrel 43. An upper end unit of the upper housing support barrel 43 may be inserted through a lower opening of the upper housing 32 to be fixedly coupled to an inner circumferential surface of the upper housing 32, and a lower end unit of the upper housing support barrel 43 may be inserted into and fixedly coupled to an inner circumferential edge defining an upper opening of the input side steering angle sensor housing 40.

The drive motor 70 includes a rotor 74 and a stator 71 disposed between the middle large diameter end unit 66 and the second end unit 63 of the input shaft 60.

The rotor 74 is disposed coaxially with the input shaft 60 rotatably about the axis AX. The input shaft 60 passes through the rotor 74. The rotor 74 includes a hollow tube 75 having a hollow portion 76 through which the input shaft 60 passes, and a magnet 77 installed to surround the hollow tube 75.

The stator 71 may include a coil configured to surround the magnet 77 and spaced apart from the magnet 77, and an iron core fixed to the driving motor housing 34 and configured to support the coil.

The driving motor 70 may include a motor electronic control unit (ECU) (not illustrated) that controls an electric signal applied to the coil. When a main ECU (not illustrated) of the vehicle may transmit a driving motor control signal to the motor ECU of the driving motor 70, and thus when the electric signal generated by the motor ECU is applied to the coil, the rotor 74 may rotate independently of the input shaft 60.

The speed reducer 80 includes a wave generator 81, the flex spline 83, a circular spline 90, and the output shaft 95. The speed reducer 80 may be a harmonic drive speed reducer.

The wave generator 81 is fixed to the hollow tube 75 of the rotor 74 and rotates as the rotor 74 rotates. Although the cross-sectional surface shape of the wave generator 81 is illustrated as circular in FIGS. 9 and 10, the cross-sectional surface shape of the wave generator 81 may be various closed curve shapes such as an elliptical shape other than a circular shape and a triangle having curved vertices.

The flex spline 83 may include a deformable ring unit 86, an outer circumferential gear unit (not illustrated), and the lower ring unit 84.

The deformable ring unit 86 has an opened upper side into which the wave generator 81 is inserted, and the deformable ring unit 86 surrounds the wave generator 81. An inner circumferential surface of the deformable ring unit 86 is in contact with an outer circumferential surface of the wave generator 81, and as the wave generator 81 rotates, the shape of the deformable ring unit 86 is deformed. The outer circumferential gear unit may include a plurality of gear teeth (not illustrated) formed on an outer circumferential surface of the deformable ring unit 86.

The lower ring unit 84 may include a plurality of female gear teeth formed on an inner circumferential surface 85 thereof. The plurality of male gear teeth formed on the outer circumferential surface of the lower end unit 63 of the input shaft 60 are meshed with the plurality of female gear teeth formed on the inner circumferential surface 85 of the lower ring unit 84, so that the lower end unit 63 of the input shaft 60 and the lower ring unit 84 of the flex spline 83 may be spline-coupled. Thus, when the input shaft 60 rotates, the flex spline 83 also rotates. The flex spline 83 may be formed of a deformable metal material.

The circular spline 90 includes a rigid ring unit 91 and an inner circumferential gear unit (not illustrated). The rigid ring unit 91 has a cross section in the shape of a circular ring, and the rigid ring unit 91 has an opened upper side into which the deformable ring unit 83 is inserted, and a lower end unit connected to the output shaft 95. The inner circumferential gear unit may include a plurality of gear teeth (not illustrated) formed on an inner circumferential surface of the rigid ring unit 91.

The inner circumferential gear unit of the circular spline 90 is meshed with the flex spline 83, specifically, the outer circumferential gear unit of the deformable ring unit 86. In other words, only some of the plurality of male gear teeth belonging to the outer circumferential gear unit of the flex spline 83 may be meshed with the inner circumferential gear unit of the circular spline 90. When the wave generator 81 rotates about the axis AX as the rotor 74 rotates, a meshed point between the outer circumferential gear unit of the flex spline 83 and the inner circumferential gear unit of the circular spline 90 may change, and the circular spline 90 may also rotate about the axis AX.

When the input shaft 60 rotates, the flex spline 83 rotates about the axis AX, and thus the meshed point between the outer circumferential gear unit of the flex spline 83 and the inner circumferential gear unit of the circular spline 90 changes, and the circular spline 90 rotates about the axis AX. Consequently, the circular spline 90 rotates as at least one of the wave generator 81 and the flex spline 83 rotates.

An example will be described, in which the vehicle travels in a manual driving mode. When a direction in which the driver steers the steering wheel 2 and a rotation direction of the drive motor 70 are opposite to each other, in other words, when a rotation direction of the input shaft 60 and a rotation direction of the rotor 74 are opposite to each other, the steering ratio, which is the ratio of a rotation angle of the output shaft 95 to a rotation angle of the input shaft 60, decreases. In this case, the steering angles of the wheels 4 decrease compared to the case where the rotor 74 does not rotate and only the input shaft 60 rotates. That is, the steering angles outputted to the wheels 4 are smaller than the steering angles inputted by the driver. When the vehicle travels at a high speed, the main controller of the vehicle may control the driving motor 70 so that the steering ratio decreases as described above.

When the direction in which the driver steers the steering wheel 2 and the rotation direction of the drive motor 70 are the same as each other, in other words, when the rotation direction of the input shaft 60 and the rotation direction of the rotor 74 are the same as each other, the steering ratio, which is the ratio of the rotation angle of the output shaft 95 to the rotation angle of the input shaft 60, increases. In this case, the steering angles of the wheels 4 increase compared to the case where the rotor 74 does not rotate, and only the input shaft 60 rotates. That is, the steering angles outputted to the wheels 4 are greater than the steering angles inputted by the driver. When the vehicle travels at a low speed, the main controller of the vehicle may control the driving motor 70 so that the steering ratio increases as described above.

The output shaft 95 extends along the axis AX, and is connected to a lower end of the rigid ring unit 91. The circular spline 90 and the output shaft 95 may be integrally formed as a single member. Accordingly, the output shaft 95 rotates coaxially when the circular spline 90 rotates. A plurality of male gear teeth spline-coupled to an upper end unit of the joint 28 may be formed on an outer circumferential surface of a lower end unit of the output shaft 95.

The input side steering angle sensor 101 may be installed to surround the middle large diameter end unit 66 of the input shaft 60, and measure the rotation direction and rotation angle of the input shaft 60 that rotates as the driver rotates the steering wheel 2. The output side steering angle sensor 105 may be installed to surround an upper side of the male gear teeth of the output shaft 95, and measure the rotation direction and rotation angle of the output shaft 95.

When the vehicle travels, a detection signal of the input side steering angle sensor 101 is transmitted to the main controller of the vehicle, and the main controller of the vehicle determines the rotation direction and rotation angle of the rotor 74 on the basis of the detection signal inputted from the input side steering angle sensor 101 and the vehicle speed, and the driving motor control signal corresponding thereto is transmitted to the motor ECU (not illustrated) of the driving motor 70.

A detection signal of the output side steering angle sensor 105 is transmitted to the main controller of the vehicle. The main controller of the vehicle may compare the rotation direction and rotation speed of the output shaft 95, calculated on the basis of the detection signal inputted from the input side steering angle sensor 101 and the driving motor control signal transmitted to the motor ECU, with the actual rotation direction and rotation speed of the output shaft 95 identified through the detection signal of the output side steering angle sensor 105.

When the vehicle travels in an autonomous driving mode, the steering wheel 2, the steering wheel connection shaft 50 and the input shaft 60 do not rotate, but only the rotor 74 rotates so that the output shaft 95 rotates. That is, in the case of the autonomous driving mode, the steering wheel 2 is fixed in a non-rotating state, and the operation of the driving motor 70 is controlled according to an autonomous driving signal to rotate the output shaft 95.

The cooperative steering apparatus 30 according to another embodiment of the present disclosure may further include a rotation locking part 110 that selectively blocks rotation of a steering wheel connection shaft 50. In other words, when a vehicle travels in an autonomous driving mode, the rotation of the steering wheel connection shaft 50 is blocked by the rotation locking part 110 so that the input shaft 60 does not rotate.

The rotation locking part 110 includes the solenoid lock 111 and the pin fastening unit 132. The solenoid lock 111 includes a lock housing 112 coupled to form a closed inner space, a solenoid 116 installed in the inner space of the lock housing 112, a spring 120, a spring support 121, a lock pin 127, a pin support 125, and a lock cap 114 coupled to the lock housing 112 and configured to close the inner space of the lock housing 112.

The lock housing 112 is coupled and fixed to a lock fixing unit 33 protruding from an outer circumferential surface of an upper housing 32. The lock pin 127 extends in a radial direction orthogonal to an axis AX, and is movable in a direction approaching from the lock housing 112 toward the steering wheel connection shaft 50 and the opposite direction thereof. The solenoid 116 having a wound coil generates electromagnetic force for moving the lock pin 127 by an electric signal applied from a main controller of the vehicle (not illustrated).

The pin support 125 fixedly supports the lock pin 127, and is located in the lock housing 112 so that the lock pin 127 is movable in the direction approaching the steering wheel connection shaft 50 and the opposite direction thereof. The spring 120 elastically pressurizes the pin support 125 and the lock pin 127 in the direction approaching the steering wheel connection shaft 50. The spring support 121 is fixedly installed in the lock housing 112, and supports the spring 120. One end of the spring 120 is supported by the spring support 121, and the other end of the spring 120 is supported by the pin support 125.

The rotation locking part 110 further includes the pin fastening unit 132 into which the lock pin 127 is inserted when the lock pin 127 moves toward the steering wheel connection shaft 50. As illustrated in FIGS. 11 and 12, a shaft coupling ring 130 may be fixedly supported on an outer circumferential surface of the steering wheel connection shaft 50, and the pin fastening unit 132 may be a hole or a stepped groove formed on an outer circumferential surface of the shaft coupling ring 130. When steering angles of wheels 4 are not biased to the left or right, that is, when a steering wheel 2 is disposed in a neutral position, the formation position of the pin fastening unit 132 may be determined so that the lock pin 127 and the pin fastening unit 132 are aligned on an imaginary straight line orthogonal to the axis AX.

When the electric signal is not applied to the solenoid 116, the pin support 125 and the spring support 121 are spaced apart by a predetermined distance ST in the lock housing 112 by elastic restoring force of the spring 120, and a tail end unit of the lock pin 127 protrudes from the lock housing 112 toward the steering wheel connection shaft 50 and is inserted into the pin fastening unit 132, thereby blocking the rotation of the steering wheel connection shaft 50. Accordingly, the steering wheel 2, the steering wheel connection shaft 50 and the input shaft 60 are locked so as not to rotate.

When the electric signal is applied to the solenoid 116, the electromagnetic force stronger than the elastic restoring force of the spring 120 is generated so that the pin support 125 and the lock pin 127 move away from the steering wheel connection shaft 50. Accordingly, the lock pin 127 is inserted into the lock housing 112 and separated from the pin fastening unit 132 so that the steering wheel 2, the steering wheel connection shaft 50 and the input shaft 60 are unlocked.

The pin fastening unit 132 may extend in a longitudinal direction of the steering wheel connection shaft 50 so that the steering wheel connection shaft 50 may move in an axis AX direction, that is, the longitudinal direction in a state where the tail end unit of the lock pin 127 is inserted into the pin fastening unit 132. In this case, the driver may change the height of the steering wheel 2 by lowering or raising the steering wheel 2 in the autonomous driving mode in which the steering wheel 2 is locked. Especially, when the steering wheel 2 is lowered, a space in a driver's seat becomes wider, enabling more comfortable rest in autonomous driving mode.

In a manual driving mode or a general driving mode where the driver directly rotates the steering wheel 2, the main controller (not illustrated) of the vehicle applies the electric signal to the solenoid 116 so that the lock pin 127 is separated from the pin fastening unit 132 and the rotation of the steering wheel 2, the steering wheel connection shaft 50 and the input shaft 60 is not locked. When the driver puts the steering wheel 2 in a neutral position so that the steering angles of the wheels 4 are not biased, and instructs the main controller of the vehicle to drive the vehicle in the autonomous driving mode through a user interface (UI) of the vehicle, the main controller of the vehicle blocks the electric signal applied to the solenoid 116 so that the lock pin 127 is inserted into the pin fastening unit 132 and the rotation of the steering wheel 2, the steering wheel connection shaft 50 and the input shaft 60 is locked.

Only when the steering wheel 2, the steering wheel connection shaft 50 and the input shaft 60 are locked so as not to rotate by the rotation locking part 110, the main controller of the vehicle may set the autonomous driving mode to be turned on, and when the steering wheel 2, the steering wheel connection shaft 50 and the input shaft 60 rotate, the main controller of the vehicle may set the autonomous driving mode to be turned off.

When the vehicle needs a change of the traveling direction while traveling in the autonomous driving mode, the main controller of the vehicle transmits a driving motor control signal to a motor ECU (not illustrated), and the input shaft 60 does not rotate, only a rotor 74 rotates in response to the driving motor control signal, so that the output shaft 95 rotates.

According to the vehicle steering apparatus 1 described above, it is possible to steer the vehicle by inputting the autonomous driving steering signal to the cooperative steering apparatus 30, instead of inputting the autonomous driving steering signal to the main steering apparatus 10, in the autonomous driving mode of the vehicle. Accordingly, it is possible to easily and reliably add an autonomous driving function even to a vehicle, such as a bus or a truck, in which the hydraulic steering apparatus is adopted as the main steering apparatus 10.

When a steering direction of the wheels 4 is changed in the autonomous driving mode, the cooperative steering apparatus 30 is locked so that the steering wheel 2 does not rotate in synchronization with the changed steering direction. Accordingly, in the autonomous driving mode, it is easy to move and store the steering wheel 2, and the driver may lean his/her arm on the steering wheel 2. Consequently, the driver may rest more comfortably in the autonomous driving mode.

The present disclosure has been described above with reference to the embodiments illustrated in the accompanying drawings, but the embodiments are merely for illustrative purposes. A person having ordinary knowledge in the art to which the present disclosure pertains will understand that various modifications and other equivalent embodiments are possible from the embodiments. Accordingly, the true technical scope of the present disclosure should be defined only by the following claims.

What is claimed is:

1. A cooperative steering apparatus comprising:
an input shaft configured to rotate as a steering wheel of a vehicle rotates;
a drive motor comprising a rotor configured to rotate independently of the input shaft; and
a speed reducer comprising a wave generator configured to rotate as the rotor rotates, a flex spline configured to rotate as the input shaft rotates, a circular spline configured to rotate as at least one of the wave generator and the flex spline rotates, and an output shaft configured to rotate coaxially with the circular spline,
wherein the input shaft does not rotate, and only the rotor rotates so that the output shaft rotates when the vehicle travels in an autonomous driving mode.

2. The cooperative steering apparatus of claim 1, wherein the rotor is disposed coaxially with the input shaft, and the input shaft passes through the rotor.

3. The cooperative steering apparatus of claim 1, wherein:
the circular spline comprises a rigid ring unit connected to the output shaft, and an inner circumferential gear unit comprising a plurality of gear teeth formed on an inner circumferential surface of the rigid ring unit, and
the flex spline comprises a deformable ring unit configured to surround the wave generator and having a shape adapted to deform when the wave generator rotates, and an outer circumferential gear unit comprising a plurality of gear teeth formed on an outer circumferential surface of the deformable ring unit, and meshed with the inner circumferential gear unit.

4. The cooperative steering apparatus of claim 1, further comprising:
an input side steering angle sensor configured to measure a rotation angle of the input shaft; and
an output side steering angle sensor configured to measure a rotation angle of the output shaft.

5. The cooperative steering apparatus of claim 1, further comprising:
a steering wheel connection shaft having a first end connected to the steering wheel and a second end connected to the input shaft, and configured to transmit rotation of the steering wheel to the input shaft; and
a rotation locking part configured to block rotation of the steering wheel connection shaft.

6. The cooperative steering apparatus of claim 5, wherein:
the rotation locking part comprises a stopper protrusion protruding toward the input shaft so as not to contact the input shaft, and a protrusion fastening unit opened from a tail end of the second end of the steering wheel connection shaft toward the first end thereof, and
the steering wheel connection shaft is configured to move toward the output shaft and the stopper protrusion is configured to be inserted into the protrusion fastening unit so that the rotation of the steering wheel connection shaft is blocked when the stopper protrusion and the protrusion fastening unit are aligned in a direction parallel to an axis of the input shaft.

7. A vehicle steering apparatus comprising:
a cooperative steering apparatus comprising:
an input shaft configured to rotate as a steering wheel of a vehicle rotates,
a drive motor comprising a rotor configured to rotate independently of the input shaft, and
a speed reducer comprising a wave generator configured to rotate as the rotor rotates, a flex spline configured to rotate as the input shaft rotates, a circular spline configured to rotate as at least one of the wave generator and the flex spline rotates, and an output shaft configured to rotate coaxially with the circular spline; and a main steering apparatus configured to change steering angles of wheels of the vehicle in conjunction with rotation of the output shaft, wherein the input shaft does not rotate and only the rotor rotates so that the output shaft rotates when the vehicle travels in an autonomous driving mode.

8. The vehicle steering apparatus of claim 7, wherein the main steering apparatus is a hydraulic steering apparatus comprising a steering gear box configured to change the steering angles of the wheels, and an oil pump configured to pressurize hydraulic oil and inject hydraulic oil into the steering gear box.

9. A cooperative steering apparatus comprising:
an input shaft configured to rotate as a steering wheel of a vehicle rotates;
a drive motor comprising a rotor configured to rotate independently of the input shaft;
a speed reducer comprising a wave generator configured to rotate as the rotor rotates, a flex spline configured to rotate as the input shaft rotates, a circular spline configured to rotate as at least one of the wave generator and the flex spline rotates, and an output shaft configured to rotate coaxially with the circular spline;
a steering wheel connection shaft comprising a first end connected to the steering wheel and a second end connected to the input shaft, and configured to transmit rotation of the steering wheel to the input shaft; and
a rotation locking part configured to selectively block rotation of the steering wheel connection shaft, and including a lock pin that is movable in a direction approaching the steering wheel connection shaft from outside of the steering wheel connection shaft and in an opposite direction thereof.

10. The cooperative steering apparatus of claim 9, wherein the rotation locking part further comprises a solenoid configured to generate electromagnetic force for moving the lock pin.

11. The cooperative steering apparatus of claim 9, wherein the rotation locking part further comprises a pin fastening unit into which the lock pin is inserted when the lock pin moves toward the steering wheel connection shaft.

12. The cooperative steering apparatus of claim 11, wherein the pin fastening unit extends in a longitudinal direction of the steering wheel connection shaft so that the steering wheel connection shaft is configured to move in the longitudinal direction in a state where the lock pin is inserted into the pin fastening unit.

13. The cooperative steering apparatus of claim 9, wherein the input shaft is configured to not rotate when rotation of the steering wheel connection shaft is blocked when the vehicle travels in an autonomous driving mode.

14. The cooperative steering apparatus of claim 9, wherein the rotor is disposed coaxially with the input shaft, and the input shaft is configured to not rotate and only the rotor is configured to rotate so that the output shaft rotates.

15. The cooperative steering apparatus of claim 9, further comprising:
an input side steering angle sensor configured to measure a rotation angle of the input shaft; and
an output side steering angle sensor configured to measure a rotation angle of the output shaft.

* * * * *